Dec. 25, 1956 — C. C. BROWN — 2,775,472
SEALING DEVICE FOR FLANGED JOINTS
Filed Nov. 14, 1952 — 2 Sheets-Sheet 1
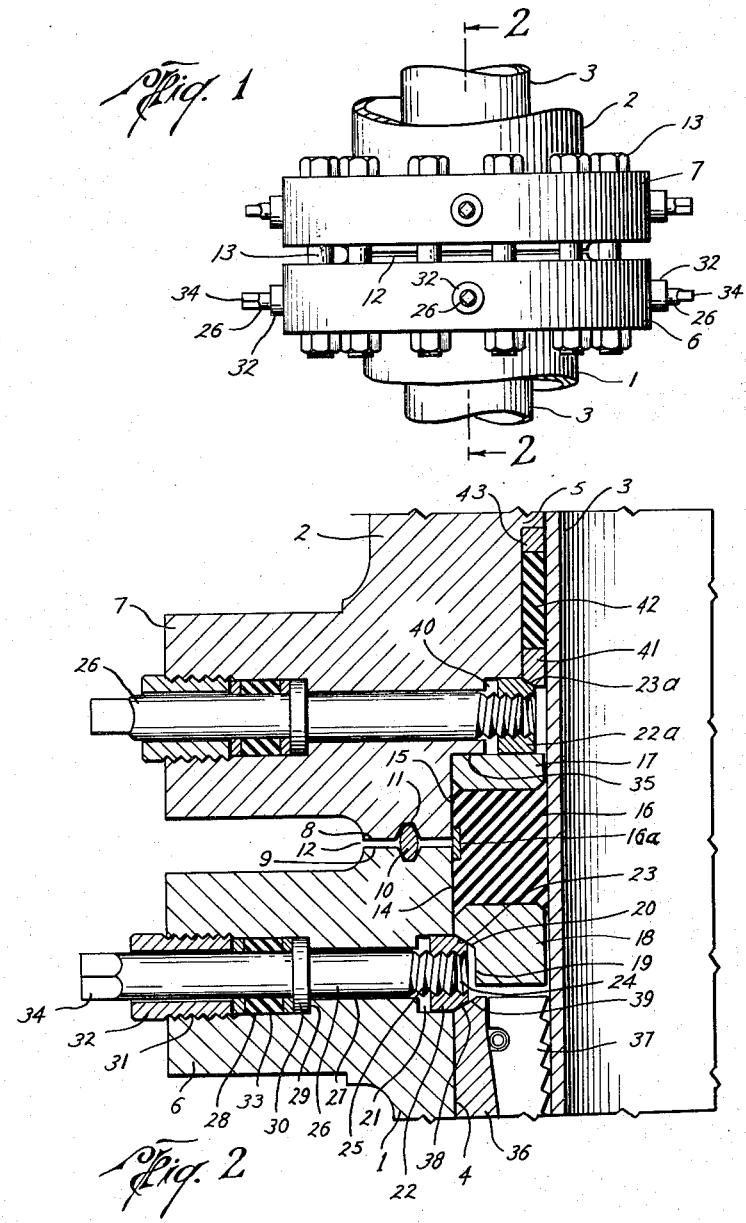
C. C. Brown
INVENTOR.
ATTORNEY

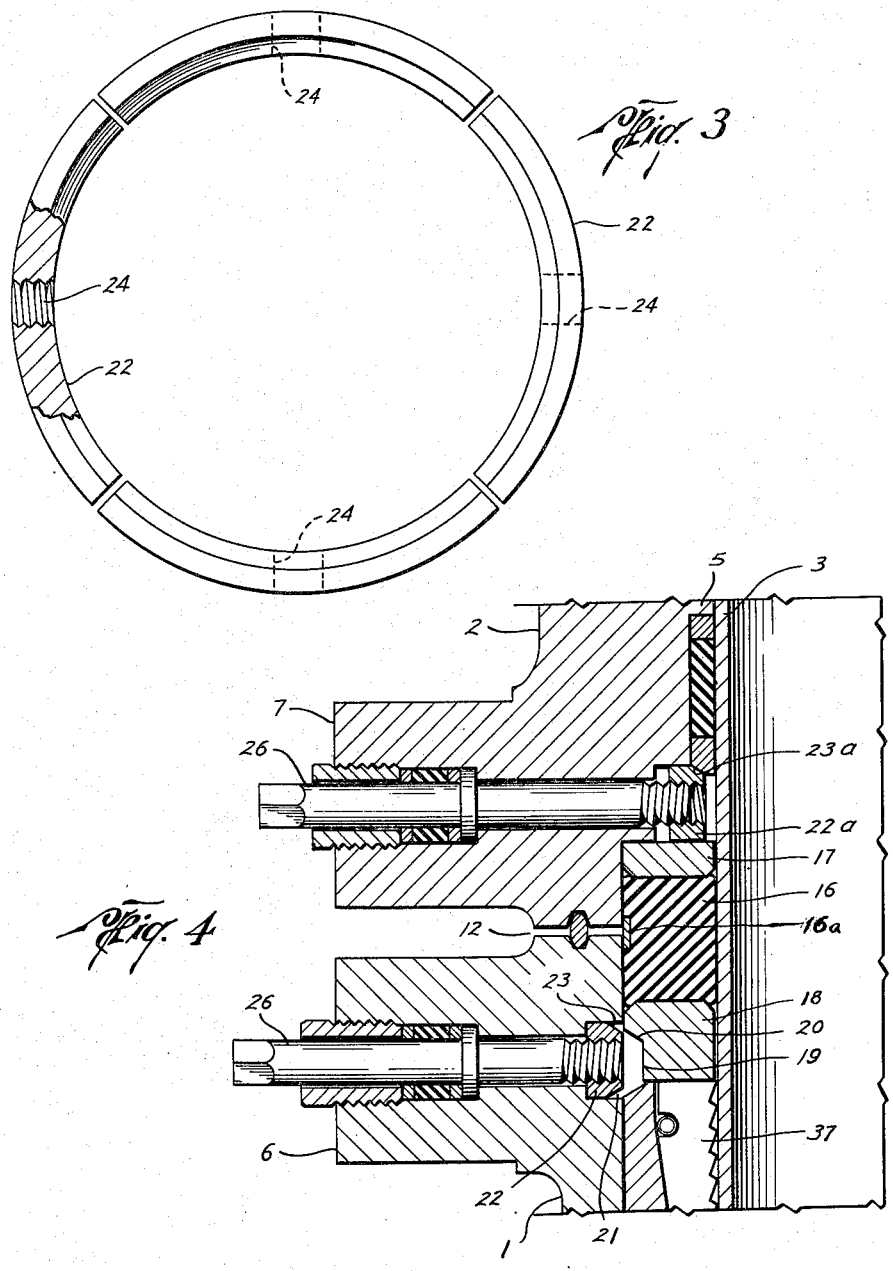

United States Patent Office 2,775,472
Patented Dec. 25, 1956

2,775,472

SEALING DEVICE FOR FLANGED JOINTS

Cicero C. Brown, Houston, Tex.

Application November 14, 1952, Serial No. 320,580

7 Claims. (Cl. 285—343)

This invention relates to joint sealing devices and particularly to devices for sealing interiorly of flange joints.

Many types of mechanical parts and fittings, particularly pipe fittings, are constructed to be connected together by means of flanges, usually annular in shape, which are connected to, or formed on, the ends of the fittings, and which are shaped to form mating annular joining surfaces, being usually clamped or connected together by means of bolts or equivalent connecting devices.

In order to seal the joint formed by the engaged annular surfaces of such flanges, gaskets of various types are ordinarily inserted between the surfaces to be tightly compressed between the surfaces when the bolts or other connecting devices are tightened. Such gaskets are ordinarily constructed of metal or compressible composition material which are made in numerous forms well known in the mechanical arts.

However, since such gaskets must necessarily be interposed between the engaged flange surfaces, a narrow space will inherently be provided between the surfaces which will expose the sealing gaskets to fluids confined within or flowing through the fittings. Such fluids are often highly corrosive or erosive in character and are frequently under high pressures and may destructively attack the gaskets and destroy their sealing effectiveness.

Accordingly, the present invention has for its primary object the provision of a seal device for sealing the inner end of the space between the adjacent sealing surfaces of a flange joint.

Another object is to provide a seal device which comprises an annular seal ring of compressible resilient material adapted to be circumferentially positioned over the inner end of the space between the adjacent sealing surfaces of a flange joint, metallic end rings mounted on the opposite ends of the seal ring, and compression means mounted in the respective flanges and constructed and arranged to engage the end rings to axially compress the seal ring whereby to seal the inner end of the space between the flanges.

A further object is to provide an annular seal ring of compressible resilient material adapted to be circumferentially positioned over the inner end of the flange joint space, radially compressible thrust rings engageable with the opposite ends of said seal ring having bevelled surfaces cooperating with similar surfaces on the ends of the seal ring to axially compress the latter when the thrust rings are urged radially inwardly.

Other and more specific objects of this invention will become apparent from the following detailed description when read in conjunction with the accompanying drawing which illustrates useful embodiments in accordance with this invention.

In the drawing:

Fig. 1 is an elevational view of a flange joint employing a sealing device in accordance with the present invention;

Fig. 2 is an enlarged fragmentary view in longitudinal section taken generally along line 2—2 of Fig. 1 illustrating the positions of the parts of the sealing device when compressively activated;

Fig. 3 is a plan view, partly in section, of one of the thrust or compression rings forming a part of the sealing device; and Fig. 4 is a view similar to Fig. 2 showing the positions of the parts of the sealing device in inactive condition.

Fig. 1 illustrates a flange joint formed between the flanged ends of a pair of generally tubular fittings 1 and 2, such as are commonly employed in forming the well head or "Christmas Tree" of an oil or gas well. It will be understood that this particular type of fitting has been selected merely for purpose of illustration of one application of the present invention which, it will be recognized, is applicable generally to numerous other types of flanged fittings.

Fittings 1 and 2 may be the conventional well casing and tubing heads which are adapted to be connected together about a pipe 3 which extends through the respective bores 4 and 5 of fittings 1 and 2.

Fittings 1 and 2 are provided at their adjacent ends with annular external flanges 6 and 7, respectively, having opposing annular sealing surfaces 8 and 9, respectively, between which may be inserted an annular sealing gasket 10 of any generally conventional form commonly employed for sealing a flange joint. In the illustrative embodiment, gasket 10 is an oval metal ring commonly used for sealing between the flanges of high pressure fittings, the ring being seated in registering annular seating grooves 11—11 in the surfaces 8 and 9. It will be understood, of course, that other types of gaskets, such as the well known flat rings, may be inserted between the surfaces 8 and 9. Irrespective of the type gasket employed, its interposition between surfaces 8 and 9 will necessarily separate these faces and provide the space 12 which will be open at its inner end to communication with the bore of the joint and which will permit access to the gasket of fluids confined within or flowing through the fittings.

The fittings may be connected together by any suitable and generally conventional means, such as a plurality of angularly spaced bolts 13 which, when suitably tightened, will urge surfaces 8 and 9 toward each other to tightly compress gasket 10 between the surfaces to thereby prevent leakage of fluid through space 12 from the interior of the joint.

The flanges 6 and 7 are provided with bore wall portions 14 and 15, respectively, adjacent space 12 which are substantially flush with each other to provide an annular sealing surface against which an annular sealing ring 16 is circumferentially disposed and longitudinally dimensioned and positioned to bridge space 12. Sealing ring 16 is composed of any suitable flexible resilient material, such as natural or synthetic rubber or composition material. The radial thickness of ring 16 is preferably, though not necessarily, made such as to fill the space between the bore wall of the flanges and the exterior of pipe 3 or any other object which may extend through the bores of the fittings and serve to limit radial inward expansion of the ring when under axial compression, the ring in such cases serving also to seal the annular space between the bore walls of the fittings and the pipe or other object extending therethrough.

Positioned against the upper and lower ends of ring 16 are a pair of metallic end rings 17 and 18, respectively, which may be permanently secured to the ends of ring 16, as by vulcanizing, or may be separably mounted on the ends of ring 16. Ring 17 will thus be positioned opposite flange 7 and ring 18 opposite flange 6. To illustrate the multi-functional character of the sealing device in accordance with this invention and several possible embodiments thereof, end rings 17 and 18 are illustrated as being of somewhat different shape, although they may be of identical shape if desired, as will be explained hereinafter.

In the illustrative embodiment, upper ring 17 has a flat upper surface and inner and outer peripheral surfaces which are flush with those of seal ring 16. Lower end ring 18 has the outer end of its outer peripheral surface cut away at 19 to form an inwardly and downwardly bevelled surface 20. The bore wall of flange 6 is provided with an annular groove 21 of generally rectangular cross-section which is positioned substantially opposite cutaway portion 19. A segmented thrust ring 22 (see Fig. 3) composed of a plurality of separate complementary arcuate segments is mounted in groove 21 for radial movement therein relative to cutaway portion 19 of ring 18. The upper forward corner of ring 22 is bevelled at 23 to complement the slope of surface 20 on ring 18. Each of the segments of ring 22 is provided with an internally threaded radial socket 24 which is adapted to receive the threaded end 25 of a thrust bolt 26 which extends radially through flange 6 to the exterior thereof through a radial passage 27 in which bolt 26 is journalled. Passage 27 is counterbored from its outer end at 28 to form an internal shoulder 29 adapted to receive a thrust collar 30 secured to, or formed about, the outer periphery of bolt 26. The outer end of counterbore 28 is internally threaded at 31 to receive a tubular bushing 32 which surrounds the outer portion of bolt 26 and forms a gland for compressing a packing ring 33 mounted in counterbore 28 between shoulder 29 and the inner end of bushing 32 and surrounding bolt 26. The outer end of bolt 26 carries a polygonal end portion 34 for application of a wrench or other tool for turning bolt 26. It will be seen that thrust ring 22 may be termed a radially compressible thrust member, in that as bolts 26 are rotated in one direction, the connected arcuate segments composing ring 22 will be urged radially inwardly reducing the diameter of the ring and advancing it radially out of groove 21 and toward ring 18, while rotation of bolts 26 in the opposite direction will radially retract the segments, enlarging the diameter of the thrust ring and withdrawing it into groove 21.

In one embodiment of this invention, as illustrated in Figs. 2 and 4, the bore wall of flange 7 may be provided with a downwardly facing internal shoulder 35 which serves as a stop or abutment engageable with the upper surface of end ring 17 to limit upward axial movement of the seal ring.

With the arrangement thus far described, it will be seen that when bolts 26 are rotated in the direction to urge the segments of ring 22 inwardly of the bore of the flanges, bevelled surface 20 on end ring 18 and the resultant force, when the seal ring is restrained against inward movement, as by the pipe 3, will axially compress seal ring 16 against shoulder 35 and thus form a tight seal across the inner end of space 12, thereby effectively preventing the entrance of any fluids from the bore of the joint into space 12. Fig. 2 illustrates the compressed position of the seal ring, while Fig. 4 illustrates the seal ring in expanded position with thrust ring 22 in retracted position. A metallic insert 16a may, if desired, be mounted or embedded in the outer periphery of sealing ring 16 to be positioned across the inner end of space 12 to prevent extrusion of the material composing sealing ring 16 into space 12 when the sealing ring is axially compressed. The body of sealing ring 16 will, of course, seal about the edges of insert 16a and along bore wall portions 14 and 15.

In another embodiment illustrated in the drawings thrust ring 22 may be simultaneously employed to axially depress or hold down an additional tool which may be mounted in the bore of fitting 1. For example, if the latter is a conventional casinghead, it may have installed in the bore thereof a slip bowl 36 in which are inserted conventional toothed pipe wedges or slips 37 which are adapted to grip and support pipe 3. To prevent the slip bowl and slips from being forced upwardly by forces exerted from below these tools, thrust ring 22 may have its lower forward corner bevelled, as at 38, and adapted to engage a complementary bevelled surface 39 on the upper end of slip bowl 36. Thus, a thrust ring 22 is urged inwardly to axially compress seal ring 16 upwardly, surface 38 will simultaneously engage surface 39 on the slip bowl and urge the latter downwardly and lock it against upward movement. Moreover, the axial compression of seal ring 16 will not only serve to seal the inner end of the flange joint but will also form a fluid-tight seal across the annular space between the bore wall of the flange joint and pipe 3 and thereby prevent escape of fluids upwardly along the exterior of pipe 3.

Returning now to flange 7, another modification of a means for compressing seal ring 16 is illustrated. In this modification, an annular groove 40 is provided in bore wall of the flange above and inwardly of shoulder 35 and is open at its lower end. A segmental thrust ring 22a is mounted for axial movement in groove 40, the lower end face of the ring riding directly on the upper flat surface of end ring 17. The means for moving thrust ring 22a radially is substantially identical in form and operation with that described above for moving thrust ring 22. The upper forward corner of thrust ring 22a may be bevelled, as at 23a, for engagement with a complementary bevelled abutment member, such as a compression ring 41 mounted in the annular space above groove 40 between the bore wall of fitting 2 and pipe 3 for compressing a packing 42 disposed in this annular space against an abutment member 43 positioned above packing 42. It will be seen that as thrust ring 22a is urged inwardly by thrust bolts 26, the engagement of its bevelled surface 23a with the like-bevelled surface of compression ring 41 will urge the latter upwardly compressing packing 42 and thrust ring 22a will, at the same time, tend to urge ring 16 downwardly or at least form a solid abutment for the upper end of ring 16 while the latter may be urged upwardly and compressed by the action of thrust ring 22 previously described.

It will be evident that end rings 17 and 18 may be made identical in form and may be axially compressed from one or both ends as desired and that numerous additional modifications may be made in the means for compressing the ends of seal ring 16 by varying the shape of the thrust rings, the end rings and the abutment members engaged by the thrust rings, and in numerous other ways within the scope of the appended claims but without departing from the spirit of this invention.

What I claim and desire to secure by Letters Patent is:

1. A sealing device for internally sealing the joint between a pair of abutting flanges having coaxial bores, comprising, a resilient seal ring comprising a resilient seal portion interposed between a pair of metallic end rings, said seal portion being positioned in the bores of said flanges across the joint between the flanges and in direct sealing engagement with the bore walls of the flanges adjacent said joint, an annular abutment member circumferentially disposed in the bore of one of said flanges engaging one end of said seal ring to limit its axial movement, and an annular thrust member in the other flange radially compressible against the opposite end of said seal ring, said thrust member and said seal ring having complementary tapered engaging surfaces cooperable in response to radial compression by said thrust member to urge the seal ring axially toward said abutment member.

2. A sealing device for internally sealing the joint between a pair of abutting flanges having coaxial bores, comprising, a resilient seal ring positioned in the bores of said flanges across the joint between said flanges and in direct sealing engagement with the bore walls of the flanges adjacent said joint, said seal ring having one end thrustingly engaged with an annular abutment member circumferentially disposed in the bore of the adjacent flange, and means for axially compressing said seal ring against said abutment member to deform the seal ring into sealing engagement with said joint, said means comprising a metal end ring mounted on the opposite end of the seal ring and a segmented annular thrust member mounted in the bore wall of the other flange and radially compressible against said end ring, said thrust member and said end ring having complementary tapered engaging surfaces cooperable in response to radial compression by said thrust member to urge the seal ring axially toward said abutment member.

3. A sealing device for internally sealing the joint between a pair of abutting flanges having coaxial bores, comprising, a resilient seal ring positioned in the bores of said flanges across the joint between the flanges and in direct sealing engagement with the bore walls of the flanges adjacent said joint, said seal ring having one end thrustingly engaged with an annular abutment member circumferentially disposed in the bore of the adjacent flange, a metal end ring on the opposite end of said seal ring, an inwardly bevelled annular shoulder on the outer periphery of said end ring, and a radially compressible annular thrust member mounted in the bore wall of the other flange having a bevelled surface complementary to and engageable with the bevelled surface of said annular shoulder whereby to urge said seal ring axially toward said abutment member when said thrust member is radially compressed about said end ring.

4. A sealing device according to claim 3, wherein said thrust member comprises a metallic ring composed of complementary arcuate segments.

5. A sealing device for internally sealing the joint between a pair of abutting flanges having coaxial bores, comprising, a resilient seal ring positioned in the bores of said flanges across the joint between the flanges and in direct sealing engagement with the bore walls of the flanges adjacent said joint, said seal ring having one end thrustingly engaged with an angular abutment member circumferentially disposed in the bore of the adjacent flange, a metal end ring on the opposite end of said seal ring, an inwardly bevelled annular shoulder on the outer periphery of said end ring, an annular groove in the bore wall of the other flange opposite said end ring, an annular thrust ring composed of a plurality of complementary arcuate segments mounted in said groove for radially expansive and retractive movement relative to the outer periphery of said end ring, the inner periphery of said thrust ring having a bevelled surface engageable with said annular shoulder whereby to urge said seal ring axially toward said abutment member when said thrust ring is radially advanced into compressive engagement with said end ring, and means connected to each of said segments and extending radially to the exterior of said other flange for radially moving said segments.

6. A sealing device for internally sealing the joint between a pair of abutting flanges having coaxial bores, comprising, a resilient seal ring comprising a resilient seal portion interposed between a pair of metallic end rings, said seal portion being positioned in the bores of said flanges across the joint between the flanges and in direct sealing engagement with the bore walls of the flanges adjacent said joint, an annular abutment member circumferentially disposed in the bore of one of said flanges engaging one end of said seal ring to limit its axial movement, a radially compressible annular thrust member movably mounted in the other flange for radial engagement with the other end of said seal ring, the adjacent engaging surfaces of said thrust member and said other end of said seal ring having complementary tapers shaped to urge said seal ring axially toward said abutment member in response to said radial engagement, and means extending radially through said other flange for radially compressing said thrust member.

7. A sealing device for sealing the joint between a pair of abutting flanges having coaxial bores, comprising, a resilient seal ring comprising a resilient seal portion interposed between a pair of metallic end rings, said seal portion being positioned in the bores of said flanges across the joint between the flanges and in direct sealing engagement with the bore walls of the flanges adjacent the joint, an annular metal insert positioned in the outer periphery of the seal portion to span the joint, an annular abutment member circumferentially disposed in the bore of one of said flanges engaging one end of said seal ring to limit its axial movement, and an annular thrust member in the other flange radially compressible against the opposite end of said seal ring, said thrust member and said seal ring having complementary tapered engaging surfaces cooperable in response to radial compression by said thrust member to urge the seal ring axially toward said abutment member.

References Cited in the file of this patent

UNITED STATES PATENTS

| | | |
|---|---|---|
| 1,914,472 | Wickersham | June 20, 1933 |
| 2,054,336 | Penick et al. | Sept. 15, 1936 |
| 2,178,700 | Penick et al. | Nov. 7, 1939 |
| 2,254,752 | Penick et al. | Sept. 2, 1941 |
| 2,400,254 | Penick | May 14, 1946 |
| 2,532,662 | Eckel et al. | Dec. 5, 1950 |
| 2,533,868 | Anderson | Dec. 12, 1950 |
| 2,567,479 | Hebard | Sept. 11, 1951 |
| 2,617,485 | Thatch | Nov. 11, 1952 |